Dec. 9, 1952 L. S. FARRELL 2,621,156
METHOD FOR FEEDING FILTER AID
Filed April 10, 1947
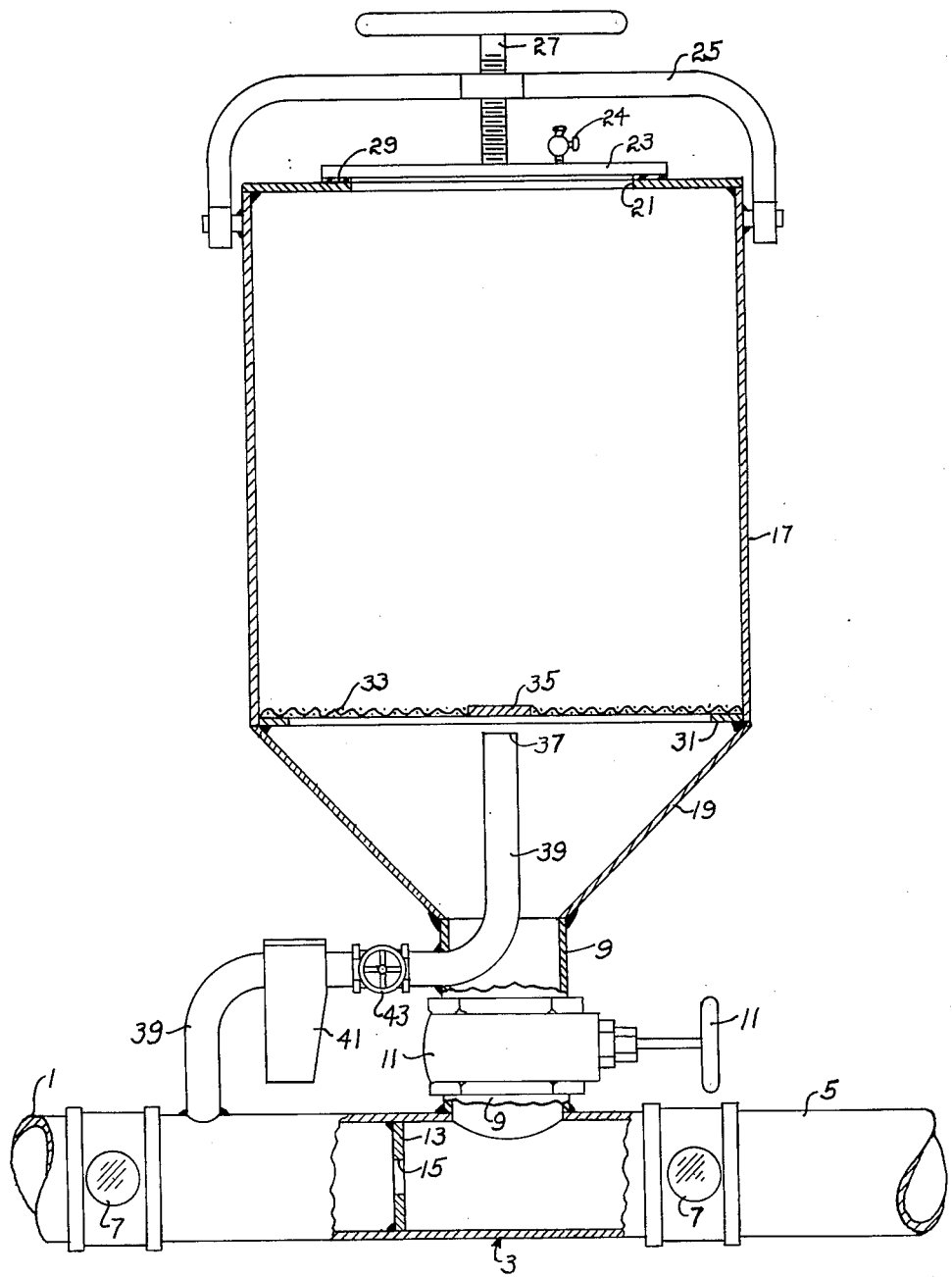
INVENTOR.
LAWRENCE S. FARRELL
BY Edmund W. E. Kamm
ATTORNEY Patented Dec. 9, 1952

2,621,156

UNITED STATES PATENT OFFICE 2,621,156

METHOD FOR FEEDING FILTER AID

Lawrence S. Farrell, Long Beach, Calif., assignor to Bowser, Inc., Fort Wayne, Ind., a corporation of Indiana Application April 10, 1947, Serial No. 740,680

5 Claims. (Cl. 210—1)

This invention relates to method for feeding filter aid. More specifically, it relates to a feeder and method wherein a body of filter aid is supported upon a perforate retainer and a stream of liquid is directed toward and across the underneath surface of the retainer to wash away or erode the filter aid.

An object of the invention is to provide means for feeding finely comminuted filter aid into a flow line leading to a filter.

Another object of the invention is to provide a method for controlledly feeding such filter aid to a filter.

Another object of the invention is to provide means for supporting a body of filter aid powder in an elevated position and feeding it by erosion to a filter.

Still another object is to utilize liquid differential pressure for eroding the powder.

Yet another object is to provide a method for controlledly feeding powder to a filter.

These and other objects will become apparent from a study of this specification and the drawing which is attached hereto and made a part hereof, and in which:

The single figure represents a vertical sectional view of the feeder and flow line showing the orifice, the erosion means and the powder supporting means.

Referring now to the drawing, the numeral 1 represents the inlet side of flow line 3 of which the outlet side is represented by 5. Sight glasses 7 are provided in the line to permit inspection of the liquid flowing therein. A vertical branch 9 is provided in the line and is fitted with a valve 11. An orifice plate 13 having an orifice 15 is fixed in the flow line upstream of the branch.

A tank 17 which preferably has a cone bottom 19 is attached to the upper end of said branch 9 and is provided with a fill opening 21, which is in turn fitted with a closure 23 which is provided with a vent valve 24 and is adapted to be held in place by means of a yoke 25 and a hand wheel actuated screw 27.

A suitable gasket 29 may be used under the cover 23 if desired.

Preferably at the top of the conical portion 19 of the tank is mounted an inwardly extending flange 31. A disk 33 of perforate material is mounted on the flange. The member is preferably of wire screen of small enough mesh to support diatomaceous earth in the usual comminuted form but which has openings of sufficient size to permit the passage of such filter aids through the screen. Applicant has found a thirty-mesh screen to serve most purposes although the size may obviously be varied to suit the conditions.

The central portion of the screen is provided with a solid deflecting disk 35 which is disposed directly over the nozzle 37 of the liquid pipe 39 which communicates with the liquid line upstream of the orifice plate 13. A strainer 41 and a control valve 43 are connected in the pipe 39.

Operation

The inlet 1 of the flow line is connected to the discharge side of the pump handling unfiltered liquid while the outlet 5 is connected to the inlet of the filter.

The orifice plate 13 and orifice 15 restrict the flow of liquid through line 3 so that the pressure upstream of the orifice will be greater than that downstream thereof. When the valves 11 and 43 are opened, there will be a flow of liquid through pipe 39 which issues as a jet from nozzle 37 and impinges on the flat, lower surface of disk 35. The stream is deflected laterally substantially parallel to the surface of the plate.

The tank 17, including the cone 19, will fill with liquid and when it passes out of the valve 24, the latter is closed. The filter aid powder being heavier than the liquid settles in a body of the screen.

The lateral flow of liquid described above will cause turbulence beneath the screen with the result that the liquid will wash or erode away the filter aid which passes with some of the liquid through the branch 9 into flow line 3 downstream of the orifice, whence it flows through sight glass 7 and line 5 to the filter.

As the filter aid resting upon the screen is removed, the body of powder moves gradually down until it is exhausted.

To refill the tank it is necessary to close valves 11 and 43, loosen screw 27, tilt the yoke 25 and remove cover 23. After the insertion of the powder in the tank the lid is replaced, vent 24 is reopened, if this is necessary, valves 11 and 43 are reopened and, as soon as liquid issues from valve 24, it may be closed.

The rate of feed of the powder depends primarily upon the opening of valve 43. When the valve is wide open, the maximum flow is obtained. The valve 11 is preferably wide open at all times during operation.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. The method of feeding filter aid into a flow line which comprises segregating a mass of filter aid material on a thin, perforate supporting member in a tank, wetting said material, admitting a flow of liquid to said tank and directing it along the underneath side of said member so as to take filter aid into suspension in the liquid through said member, and thereafter passing the filter aid bearing liquid to a filter.

2. The method of feeding filter aid into a flow line which comprises segregating a mass of filter aid material on a perforate supporting member in a tank, wetting said material, admitting a flow of liquid to said tank in the form of a jet and impinging the jet upon a surface set substantially flush with and parallel to the lower side of said member for directing it along the underneath side of said member so as to take filter aid into suspension in the liquid through said member, and thereafter passing the filter aid bearing liquid to a filter.

3. The method of feeding filter aid into a flow line which comprises segregating a mass of filter aid material on a perforate supporting member in a tank having an inlet and an outlet, applying liquid to said inlet, under higher pressure than the pressure at the outlet, forming the incoming liquid into radiating jets and directing them along the lower side of said member, so as to take filter aid into suspension in the liquid, and thereafter passing said filter aid laden liquid to said outlet.

4. The method of feeding filter aid into a flow line which comprises segregating a mass of filter aid material on a perforate supporting member in a tank having an inlet and an outlet, applying liquid to said inlet, under higher pressure than the pressure at the outlet, forming the incoming liquid into a jet, impinging said jet upon a surface substantially parallel to said member to form a radiating flow of liquid along the lower side of said member, so as to take filter aid into suspension in the liquid, and thereafter passing said filter aid laden liquid to said outlet.

5. The method of feeding filter aid into a flow line which comprises segregating a mass of filter aid material on a perforate supporting member in a tank, wetting said material, maintaining a body of liquid in said tank at least to the level of said member, admitting a flow of liquid to said tank in the form of a jet and directing it along the underneath side of said member so as to take filter aid into suspension in the liquid through said member, and thereafter passing the filter aid bearing liquid to a filter.

LAWRENCE S. FARRELL.

REFERENCES CITED

The following references are of record in the file of this patent:

UNITED STATES PATENTS

| Number | Name | Date |
|---|---|---|
| 322,102 | Hyatt | July 14, 1885 |
| 423,773 | Jewell et al. | Mar. 18, 1890 |
| 854,445 | Weaver | May 21, 1907 |
| 1,409,248 | Sevcik | Mar. 14, 1922 |
| 1,862,238 | Roe et al. | June 7, 1932 |
| 2,084,682 | Guenot | June 22, 1937 |
| 2,216,921 | Marvel | Oct. 8, 1940 |
| 2,462,886 | Morrow | Mar. 1, 1949 |